INVENTOR.
John O. Fundingsland
BY WHITEHEAD & VOGL
PER Earle Whitehead
ATTORNEYS INVENTOR.
John O. Fundingsland
BY WHITEHEAD & VOGL
PER Carl Whitehead
ATTORNEYS Oct. 7, 1958 J. O. FUNDINGSLAND 2,855,160

TAPE RECORDING MACHINE

Filed July 20, 1953 4 Sheets-Sheet 3

INVENTOR.

John O. Fundingsland

BY WHITEHEAD & VOGL

PER Earle Whitehead

ATTORNEYS

INVENTOR.
John O. Fundingsland
BY WHITEHEAD & VOGL
PER [signature]
ATTORNEYS

United States Patent Office 2,855,160

Patented Oct. 7, 1958

2,855,160

TAPE RECORDING MACHINE

John O. Fundingsland, Colorado Springs, Colo.

Application July 20, 1953, Serial No. 369,174

10 Claims. (Cl. 242—55.14)

This invention relates to sound recording and reproducing devices of the type which record sounds magnetically upon a steel or other magnetic wire or tape by actuating in an electromagnet the variations in electric current from a microphone as the wire or tape moves between the poles thereof, and which reproduce the sound as the magnetized wire or tape passes again between the poles with a loud-speaker replacing the microphone, and more particularly to such devices commonly known as "tape recorders."

The conventional tape recorder is adapted to carry a pair of reels whereon a length of tape is wound, each end being fastened to a reel so that a reach of tape always extends between the reels. Magnetic recording and playback and erasing heads, and mechanical driving means are positioned alongside the tape within this reach and recording or playback operations of the tape recorder occur when the driving means are operative to engage and move the tape at a selected fixed rate of speed. Such movement must be accompanied by rotation of the reels to wind the tape from one reel to the other and to hold the reach between the reels under a selected, uniform operative tension. Mechanical means also are included which provide a quick transfer or rewind of the tape from one reel to another independently of the fixed-rate driving means to quickly shift the tape or any selected portion thereof for repeating or re-recording purposes or the like.

A paramount consideration in the design and operation of a tape recorder is the provision of means which move the tape past the recording and playback head uniformly and precisely at a selected rate of speed at all times in order to attain near perfect sound reproduction at the same frequencies at which the sound was recorded. Therefore, the tape driving means generally comprise a carefully built synchronous motor having its drive shaft inertially loaded as by a flywheel and having a capstan formed by a projecting end of the shaft adapted to bear against the tape for direct slack-free driving. To permit smooth operation of such driving means without slippage or springing or jerking of the tape, conventional tape recorders attempt to provide means for holding a balanced uniform tension upon the tape and for braking the reels to stop the tape during recording, playing and high-speed-rewind operations.

Actually, such conventional tape and reel control means do not adequately solve all operational problems encountered in a tape recorder, and the present invention was conceived and developed to meet a definite need and comprises an improved, automatically-balanced, operationally coordinated tape recording machine which attains the following objects: (1) provides a uniform tension on the tape reach between the reels, with the tape moving or stationary, to prevent slack in the reach, yet not overstress the tape; (2) balances the pull of the reels on the tape whereby the tape will not move or creep whenever the operative drive means are disengaged from the tape; (3) provides floating reel shafts free of mechanical linakges or mechanical braking means which permit rotation of the reels responsive to slight unbalanced forces; (4) provides means for imposing a selected torque upon each reel shaft; (5) provides means responsive to the comparative amounts of tape on each reel for coordinating said torque imposing means to balance the reels as aforestated; (6) provides means responsive to the starting movement of the tape as the drive capstan engages the tape to impose a momentary increased torque on the tape-winding reel and a momentary decreased torque on the tape-unwinding reel to quickly accelerate the reels to recording and playback rotating speed without jerking of the tape by the drive; (7) provides means in one embodiment adapted to prevent excessive pull upon or slack of the tape under any operative condition and eliminates a necessity of bringing the apparatus to a complete stop whenever an operation is changed, as from a fast rewind to a playback or recording operation where the tape suddenly changes direction; (8) provides manually operable means for rotating the reels at any selected speed for rewind or tape shifting operations; (9) provides improved means in one embodiment adapted to permit operation by movement of the tape in either direction at variable, selected speeds; (10) provides smooth braking by said torque coordinating means; (11) provides an arrangement of elements which require no adjustments or replacements of parts through ordinary wear; (12) provides an improved arrangement of controls mechanically correlated with the driving and operating means which assures easy fool-proof operation of the machine; and (13) provides a machine which is simple in design, economical in cost, and rugged and durable in operation.

Further, the elements and combinations hereinafter described and defined as improved tape and reel control means for a tape recorder are not to be considered as limited to tape recording machines. The invention may be easily applied to and used with other devices which pass a tape, film strip or wire from one reel to another at a selected rate and under constant tension. For example, a movie camera or projector is another type of apparatus to which my invention may be applied.

With the foregoing and other objects in view, all of which more fully hereinafter appear, my invention comprises certain novel constructions, combinations and arrangements of elements and parts, as hereinafter described, and as defined in the appended claims and illustrated, in preferred embodiment, in the accompanying drawing, in which:

Figure 1:
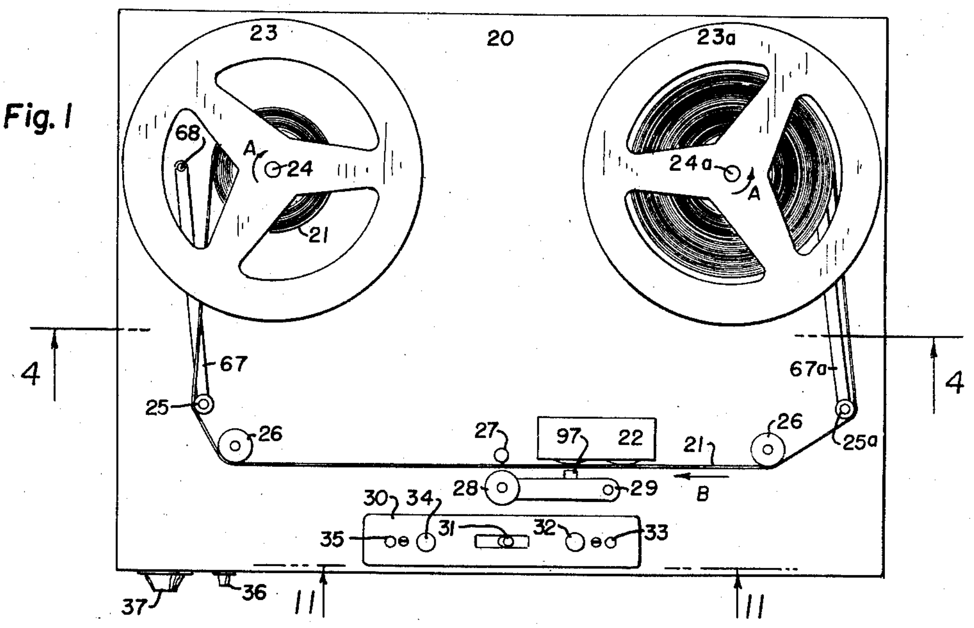
Figure 1 is a plan view of my improved tape recording machine.
Figure 2:
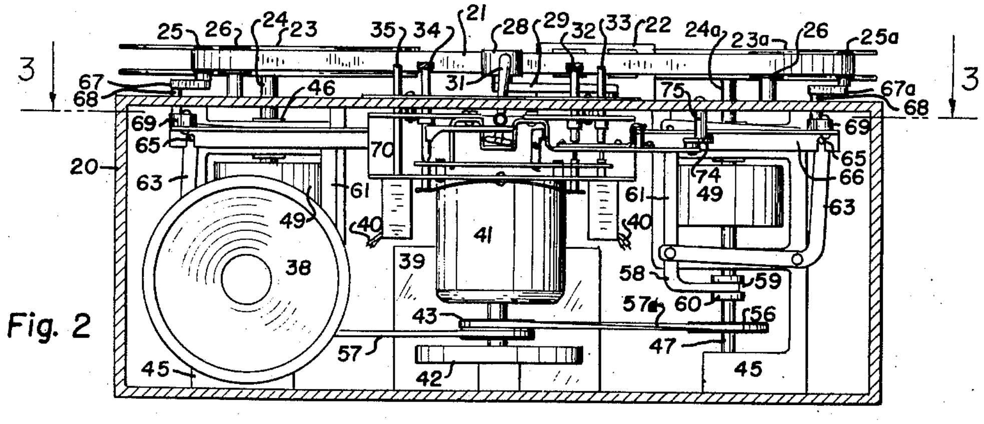
Figure 2 is a front elevation view of the machine with the front panel wall removed to show parts otherwise hidden from view.

Referring to the drawing, the tape recording machine is shown as a self-contained unit having its component parts mounted upon and within a rectangular box-like case 20. The prime element, the tape 21, is a thin ribbon of magnetizable material and is preferably of sufficient length to afford several hours of sound recording and reproduction by moving it past a conventional magnetic recording-playback-and-erasing head such as at 22. Each end of the tape 21 is wound upon a reel 23 and the reels 23 and 23*a* are mounted above the top of the case 20 upon vertical shafts 24 and 24*a* in symmetrically spaced positioning at each side of the rear portion of the case 20 and with corresponding flanges of the reels lying in the same planes to permit the tape to move and lie between the flanges without distortion.

The tape 21 is directed forwardly from each reel 23 and 23*a* past alignment-offsetting equalizer bar guide pins 25 and 25*a* hereinafter described, and around guide rollers 26 which upstand from the top of the case 20 in symmetrically spaced opposition at each side of the front portion of the case. The reach of the tape between the guide rollers 26 thereby defines a fixed portion of the path along which the tape moves as it is transferred from one reel to the other, and the head 22 upstands from the top of the case with its magnetic-contact-faces at the edge of this path in contact with the tape. A driving capstan 27 also upstands from the top of the case 20, at the center thereof, alongside the path defined by said tape reach and closely adjacent to but normally out of contact with the tape 21. For driving contact of the tape 21 with the capstan 27, a pressure roller 28 is mounted opposite the capstan upon a swingable arm 29 at the other side of the tape, and this roller is adapted to move the tape against the capstan responsive to control means hereinafter described.

The controls for this unit are mounted upon a narrow rectangular panel 30 which is positioned on top of the case 20 in front of the tape 21 reach and centered with respect to the case. These controls, which extend into the case to elements hereinafter described, include a swingable lever 31 at the center of the panel for quick transfer or rewind of the tape in either direction, a push button 32 at the right of the lever 31 which is adapted to start the playback operation, a push button 33 to the right of button 32 which is adapted to be operated in conjunction with button 32 to start a recording operation, a push button 34 to the left of the lever 31 which is adapted to stop operations, and a push button 35 to the left of button 34 which is adapted to change the speed of the capstan drive as from a conventionally used speed of 7½ inches per second to 15 inches per second. Other controls for operation of the unit include a main switch 36 and a volume control 37 which are mounted at any suitable position as at the left corner of the front panel of the case.

The mechanisms within the case 20 comprise reel driving means and controls which form the invention as hereinafter described in detail and conventional elements including a speaker 38, electronic controls for amplification of electromagnetic and sonic impulses which are shown as being housed within a box 39, and various interconnecting circuit wires which are indicated by leads 40. A microphone, not shown, is also part of this assembly. A synchronous motor 41 is mounted within this box with its drive shaft vertical and extending upwardly through the top of the case 20 to form the driving capstan 27 and extending below the body of the motor to carry a flywheel 42 and a pair of driving pulleys 43 hereinafter referred to.

Figure 9:
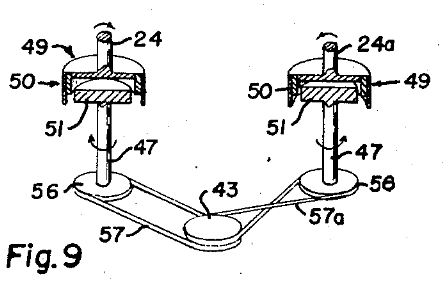
Figure 9 is a diagrammatic view of the shaft driving means shown according to the arrangement illustrated at Figs. 1 to 7.
Figure 3:
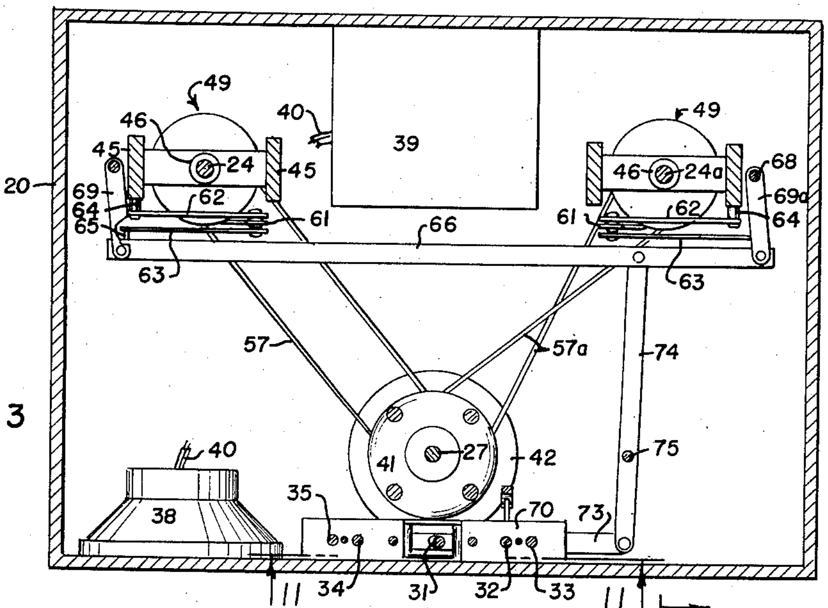
Figure 3 is a sectional plan as viewed from the indicated line 3—3 at Fig. 2.
Figure 4:
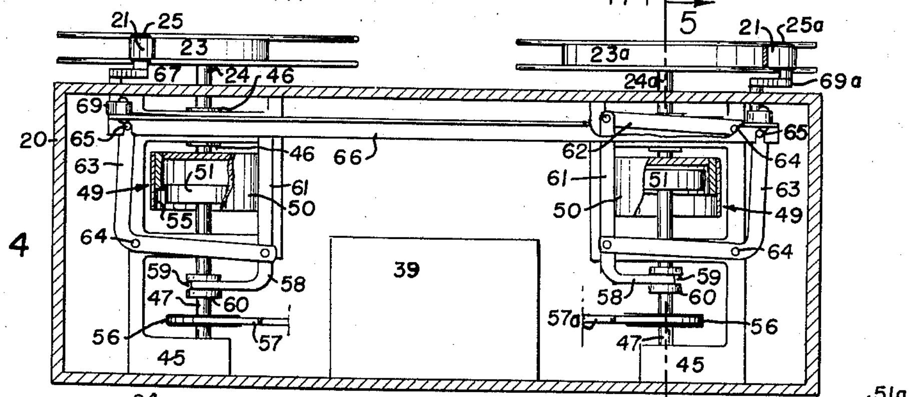
Figure 4 is a sectional elevation as viewed from the indicated line 4—4 at Fig. 1, with portions of elements broken away to show parts otherwise hidden from view.
Figure 5:
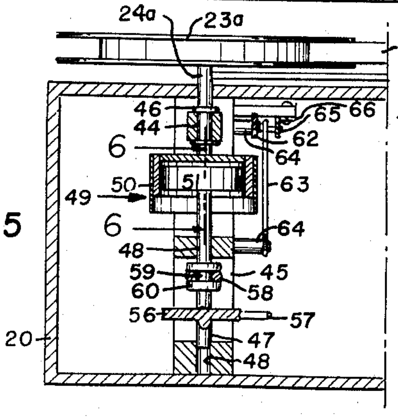
Figure 5 is a fragmentary sectional elevation as viewed from the indicated line 5—5 at Fig. 4.

Each vertical reel shaft 24 and 24*a* extends downwardly through the top of the case 20 and through a bearing orifice 44 of the upper arm of an upstanding E-shaped frame member 45. Each shaft is rotatably mounted within its bearing orifice 44 with retainer flanges 46 at each side of the bearing to prevent vertical axial movement of the shaft. A vertical drive shaft 47 is rotatably and slidably mounted within bearing orifices 48 in the center and lower arms of each E-shaped frame member 45, and is below and in common axial alignment with the reel shaft 24 or 24*a* respectively, in the upper arm of the frame member 45. Each reel shaft 24 and 24*a* is operatively interconnected with its drive shaft 47 by a variable-torque magnetic clutch 49 which is mounted between the upper and center arms of the E-frame 45, and the operation of these units provides continuous rotation of both drive shafts 47 in opposite directions, the magnetic slip of the clutches thereby imposing a continuous torque upon each reel shaft in opposite directions as indicated by the arrows A at Figs. 1, 3 and 9, all as hereinafter described in detail.

Figures 6, 7:
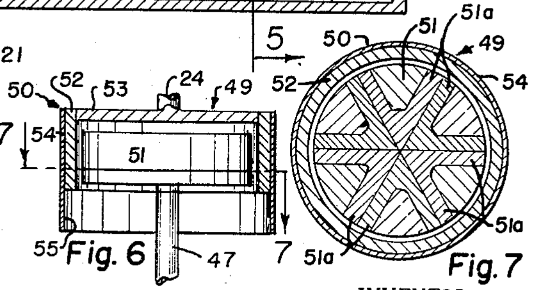
Figure 6 is a fragmentary sectional detail as viewed from the indicated line 6—6 at Fig. 5 but on an enlarged scale.
Figure 7 is a fragmentary sectional detail as viewed from the indicated line 7—7 at Fig. 6.

Each magnetic clutch comprises an inverted cup-shaped armature 50 which depends from the reel shaft 24 or 24*a*, in axial alignment therewith, and a cylindrical magnetic rotor 51 which is centered upon the top of the drive shaft 47 and adapted to rotate and move axially within the armature responsive to rotating and axial sliding movements of the shaft 47 within its bearing orifices 48. The armature 50 consists of a tubular bushing 52 of copper or similar non-magnetic metal which is end-closed by a hub 53 of non-magnetic material and encased within a cylindrical shell 54 of steel or other magnetic metal which overhangs the open end of the bushing a substantial amount as at 55. The rotor 51 is a cylindrical member which is adapted to move into the bushing 52, and is formed of magnets to provide a plurality of poles, as the six poles, 51*a*, etc., at Fig. 7. As this rotor rotates with respect to the bushing 52 and is inserted into the bushing, eddy currents are produced in the copper bushing resulting in a torque between the rotor and bushing which is directly proportional to the difference in speed of rotation and the depth of rotor insertion into the bushing. The steel shell 54 increases the magnetic flux density across the copper bushing 52 during such action and thereby increases the torque, while the overhang 55 encases the rotor at all times, even when withdrawn from the bushing, and prevents unbalanced axial forces due to the interaction of the steel shell and the magnets.

A pulley 56 is carried upon each drive shaft 47 at the lower portion of the reach between the center and lower arms of the E-frame 45, and is connected to a pulley 43 on the shaft of the motor 41 by a belt 57 or 57*a*. It is to be noted that the arrangement of elements shown in the drawing requires recording and playback movement of the tape 21 from the reel 23*a* to the reel 23, in the direction of the indicated arrow B at Figs. 1 and 11 and that rotation of the motor 41 must be clockwise. Therefore, it is necessary to cross the belt 57*a* to impose a counterclockwise torque upon the reel 23*a* but not to cross the other belt 57.

Each rotor 51 is shifted into and out of the bushing 52 to increase or decrease the torque on its reel by axial movement of the shaft 47 in its bearings 48, and the regulating shifting means include a yoke 58 whose fingers are positioned in a circumferential groove 59 of a collar 60 on the shaft 47 above the pulley 56. Each yoke 58 is carried on a vertical bar 61 having its upper end pin-connected to one end of a horizontally disposed link bar 62 and having its lower end pin-connected to the end of a horizontally disposed arm of an upstanding rocker arm 63. The opposite end of the link bar 62 and the elbow of the rocker arm 63 are pin connected to the E-frame 45 at points 64 which are in vertical alignment to form a shiftable parallelogram linkage wherein the bar 61, carrying the yoke 58, remains in a vertical position and moves vertically responsive to the tilting of the rocker arm 63 to thereby axially shift the vertically disposed shaft 47.

The upstanding end of each rocker arm carries an outstanding pin 65 which is connected to a shifting bar 66 which extends across the gap between the two reel shaft assemblies for interconnection thereof. The linkages of assemblies are in symmetrical opposition whereby movement of one rocker arm 63 to lift the bar 61 and move the rotor 51 into the bushing 52 is accompanied by an opposing movement of the other rocker arm 63 to lower its bar 61 and move that rotor 51 out of the bushing. Thus, a reciprocal interaction is attained by movement of the shifting bar 66 whereby an increase of torque on one shaft as 24*a* is accompanied by a decrease of torque on the other shaft 24 or vice versa.

The torque required on each reel 23 and 23*a*, to provide a stabilized condition with the same tape pull at each reel so that there will be no creep or tape movement when the capstan is not engaged and when the quick transfer lever 31 is in a neutral position, is directly proportional to the diameter, or radius, of the tape body wound upon the reel, and it follows that when one reel has a large body of tape wound thereon and the other reel is practically empty the torque required to balance the reels must be much greater on the full reel. Therefore, means are provided to so move the shifting bar 66 as to vary the torque on reels 23 and 23*a* responsively to the amounts of tape on each reel. These means include levers 67 and 67*a* which are swingably mounted on top of the case 20 adjacent each reel and extend forwardly therefrom with the alignment offsetting guide pins 25 and 25*a* upstanding from the forward ends of the respective levers. Pivots 68 carry and are affixed to these levers and extend through the top of the case, and a pair of secondary levers 69 and 69*a* are affixed to the pivots 68 underneath the top of the case in spaced parallelism with the respective levers 67 and 67*a*. The secondary levers 69 and 69*a* are pivotally connected to the shifting bar 66 to complete the control means and the guide pins 25 and 25*a* thereby operate in unison to move the shifting bar 66. The reach of tape from each reel 23 and 23*a* to a fixed position, the respective roller 26, will vary in direction depending upon the amount of tape upon the reel. The offsetting pins 25 and 25*a* are so spaced between these tape reaches that the tape on one reach pushes against its pin in opposition to the push against the other pin and the pushing force is related both to the tape tension and to the sharpness of the angle of the stretched tape at the pins which is a function of the amount of tape on the reel. Whenever the force against one pin exceeds that against the other, both pins move to a balanced position and the bar 66 thereby moves the slip clutch control linkage to adjust the torques on the slip clutches and balance the unit to maintain constant tape tension. It follows that clutch adjustments by movement of the pins is caused both by changing the amount of tape on the reel and by sudden starting and stopping of the capstan 27.

It is to be understood that other various arrangements of levers and guides are possible, and that some experimentation and calculations are required to determine the optimum lever lengths for any operative set-up, but such experimentation is within the skill of the art in view of the herein disclosed mode of connecting the levers.

The arrangement of elements thus far described provides uniform tape tension, balanced reel pull, floating reel shafts free of mechanical linkages and torque imposing means coordinated only with the amounts of tape on each reel, and such means are responsive to the starting movement of the tape as the drive capstan engages the tape to impose starting torques on the reels, or breaking torques to stop the reels as the capstan is disengaged, as will be explained in detail. When there is no tape movement, the levers 67 and 67*a* are so positioned that the reel torques are proportional with the amounts of tape on the reels and the forces are balanced. When the tape is engaged to the rotating capstan 27, the initial tape movement in the direction of the indicated arrow B deflects the levers 67 and 67*a* in the same direction which shifts the torque balance from that which accords with the amounts of tape on the reels to a changed condition wherein the torque is increased on the winding reel 23 and decreased on the unwinding reel 23*a*, whereby the reels commence to rotate without jerking the tape. As the reels rotate, the levers tend to shift back to a dynamic balancing position and then move responsive to changing amounts of tape on the reels to maintain this dynamic balancing position, with practically no excess force on the unwinding reel 23*a*. This dynamic balancing by the pull of the capstan causes the levers 67 and 67*a* to be pulled from a static position to an offset position in the direction of the tap movement, and when the capstan is released to stop an operation, the sudden release of pressure causes the levers 67 and 67*a* to swing oppositely from the tape direction movement to position the mechanism to induce the reel torques for quick smoothing braking action and thereby to stop the rotation.

The operative controls, lever 31 and pushbuttons 32, 33, 34 and 35 are mounted in a channel bar 70 and upstand through the top flange thereof through the top of the case 20 and through panel 30 hereinbefore described. The channel bar is suspended from the case top by bolts 71 which include washers 72 to space it from the underside of the case top to provide clearance for bolt heads and the like. The primary operative element in the control assembly is a slide bar 73 which is positioned approximately half way between the top and bottom flanges of the channel and extends beyond one end of the channel where it is pivotally connected to one end of a rocker bar 74. The rocker bar 74 extends rearwardly from the connection with slide bar 73 and its rearward end is pivotally connected to the shifting bar 66 while a fixed pin 75 is suspended from the top of the case 20 for connection of the rocker bar 74 at an intermediate point to obtain reciprocal shifting of the slide bar 73 and shifting bar 66 whereby movements of the slide bar 73 are effective to control the rotation of the reels 23 and 23*a* independently of the control exerted by the levers 67 and 67*a*.

The slide bar 73 is bent to form a pair of flat-topped humps 76 at each side of the center of the panel, and these humps 76 extend upwardly from the intermediate position of the slide bar to the underside of the top flange of the channel where the bar is attached to the channel as by bolts 77 which bolts extend through slotted orifices 78 in the humps to permit sliding movements of the bar 73.

Figures 11, 12, 13, 14, 15, 16, 17:
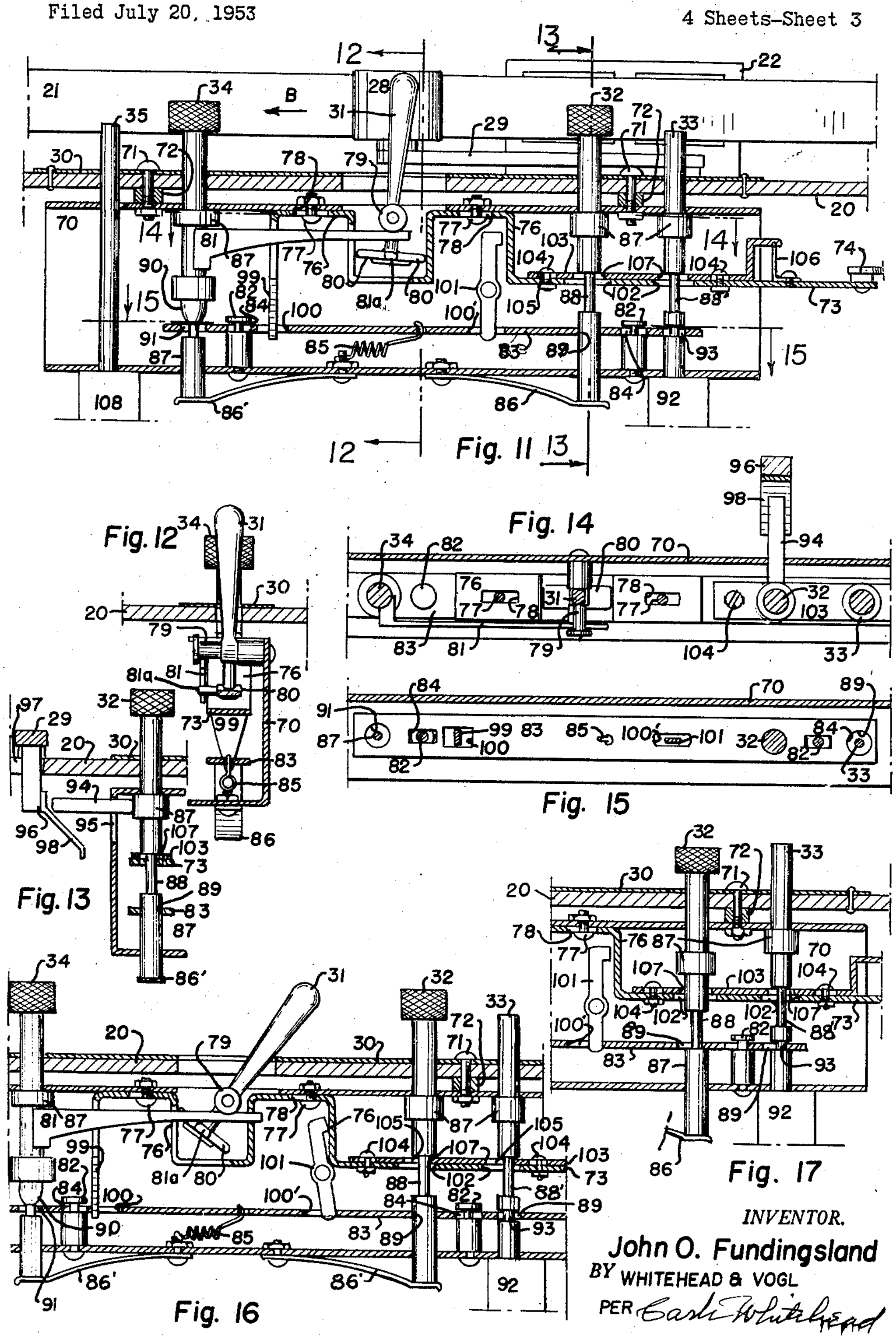
Figure 11 is a fragmentary elevation of my improved control mechanism as viewed from the indicated line 11—11 at Figs. 1 and 3, but on an enlarged scale.
Figure 12 is a sectional elevation as viewed from the indicated line 12—12 at Fig. 11.
Figure 13 is a sectional elevation as viewed from the indicated line 13—13 at Fig. 11.
Figure 14 is a sectional plan as viewed from the indicated line 14—14 at Fig. 11.
Figure 15 is a sectional plan as viewed from the indicated line 15—15 at Fig. 11.
Figure 16 is a fragmentary portion of the showing at Fig. 11, but with the elements in an alternative operative position.
Figure 17 is a fragmentary portion of the showing at Fig. 11, but with the elements therein in another alternative operative position.

The portion of the top flange of the channel 70 between the humps 76 is removed, and the shifting lever 31, which extends downwardly through a slot in the panel 30 and top of the case 20, extends into the valley between the humps 76 and is connected to the web of the channel near its top edge by a pivot 79. The portion of the shifting lever below the pivot 79 is formed as a pair of outstanding arms 80 which are adapted to move against the walls of the humps 76 to shift the bar 73 in either direction to obtain fast rewind of either reel. At the full tilted position, as shown at Fig. 16, the arms lock the shift lever in position so that a reel may be completely rewound without further attention. The release of the lever 31 from this locked position may be accomplished manually or by depressing the stop pushbutton 34 which includes an arm 81 which extends laterally from the body of the pushbutton to bear against a stub 81*a* on the lever 31.

A pair of stubs 82 upstand from the lower flange of the channel 70 to carry a lockbar 83 which is slidable thereon by virtue of slotted connections 84 therein, and this lockbar 83 is resiliently held by a spring 85 to move into locking position whenever the starting pushbutton 32 is depressed. The pushbutton shaft 32 is a cylindrical member which extends downwardly though the panel 30, case 20 top, the upper flange of channel 70, the slide bar 73, the lock bar 83 and the lower flange of channel 70, with its bottom end abutting against a lifting spring 86 attached to the underside of the lower flange of the channel. A cylindrical enlargement 87 is formed about this shaft at the underside of the upper channel flange to limit the upward movement by the spring 86, and a reduced diameter segment 88 is turned in the shaft between the slide bar 73 and lock bar 83 for interlocking the pushbutton in selected depressed position. The orifice 89 in the lock bar 83, through which the shaft 32 extends, is slightly greater than the diameter of the shaft, and when the pushbutton is depressed the reduced diameter segment 88 moves into this orifice 89 and thereby permits movement of the lock bar by spring 85 to lock the edge of the orifice 89 against the shaft shoulder at the edge of the reduced diameter segment and prevent the pushbutton 32 from lifting as clearly illustrated at Figure 17.

The stop pushbutton shaft 34 extends downwardly through the panel, case, upper channel flange, the lock bar 73 and the lower flange of the channel 70 with its bottom abutting against a lifting spring 86 attached to the underside of the lower flange of the channel. A cylindrical enlargement 87 is formed about this shaft 34 at the underside of the upper channel flange to limit the upward movement by the spring 86, and a tapered reduced-diameter segment 90 is formed at the orifice 91 in the lock bar through which the shaft 34 extends. Whenever the lock bar is shifted to a locking position, the depression of the shaft 34 causes the tapered portion 90 to enter the orifice 91 and thereby return the lock bar to the unlocked position to release the pushbutton 32. Likewise, depression of the shaft 34 carries arm 81 to release the shifting lever 31 as hereinbefore described.

The recording pushbutton 33 is formed as a shaft which extends downwardly through the panel, case top, the upper channel flange, the slide bar 73, the lock bar 83 and the lower flange of the channel 70 to a switch 92 which resiliently tends to lift the shaft whenever it is not locked in position. A cylindrical enlargement 87 is formed about the shaft at the underside of the upper channel flange to limit the upward movement caused by switch 92. A reduced diameter segment 88′ is turned in the shaft between the slide bar 73 and the lock bar 83, and a second reduced diameter segment 93 is turned in the shaft at the lock bar 83 position with the shaft raised. The orifice 89 in the lock bar 83, through which the shaft 33 extends, is of the same diameter as the shaft, and when the lock bar is shifted, as by depressing button 32, the orifice 89 moves against the shoulder of the reduced diameter segment 93 to thereby prevent depression of the shaft 33, as clearly shown at Fig. 17. When the shafts 32 and 33 are depressed simultaneously the movement of the lock bar 83 is against the reduced diameter segments 88 and 88′ and both shafts are locked in the depressed position.

The depression of the starting pushbutton 32 is accompanied by movement of the pressure roller 28 against the capstan 27 to commence movement of the tape 21. A suitable arrangement of elements to make the movement of the pressure roller 28 responsive to the depression of the pushbutton 32 comprises an arm 94 which outstands from the shaft 32 through a slot 95 in the web of the channel 70. A leg 96 depends from the swingable roller arm 29 though a slot 97 in the top of the case 20, and includes an inclined guide surface 98 which outstands from the leg 96 in the path of the arm 94, all as clearly illustrated at Fig. 13.

Because of this movement of the pressure roller against the capstan whenever the pushbutton 32 is depressed, it is essential that the pushbuttons 32 and 33 be extended and the lock bar 83 be shifted to releasing position whenever the shifting lever 31 is operated. To effect such lock bar release, with movement of the shift lever in either direction, the end of the slide bar 73, within the channel 70, is pointed and turned downwardly, as at 99, to move in a slot 100 in the lock bar, with the slot length such that no interference is encountered by normal slide bar movement nor with even excessive slide bar movement in the direction for locking the lock bar, but such that in case of excessive slide bar movement in the direction for unlocking the lock bar, the end of the slot is encountered by the point 99 and a release of the shafts 32 and 33 is effected.

A rocker 101 is pivotally mounted on the web of the channel 70 between the slide bar and lock bar with one end bearing against an upturned portion of the slide bar and the other in a slot 100′ in the lock bar. The slot 100′ length is such that no interference is encountered by normal slide bar movement, nor with even excessive slide bar movement in the direction for unlocking the lock bar, but such that in case of excessive slide bar movement in the direction for locking the lock bar the end of the slot 100′ is encountered by the rocker 101 to move the lock bar in a direction opposite the slide bar movement to release the shafts 32 and 33.

Orifices 102 and 102′ in the slide bar 73 through which the shafts 32 and 33 extend must be larger than the shaft diameters to permit normal slide bar 73 movement and to prevent jamming of the slide bar against the shafts when excessive movements of the slide bar occur as when the shifting lever 31 is operated, yet it is desirable to lock the shafts 32 and 33 in their extended position when the shifting lever 31 is in use as at Fig. 17. A sliding plate 103 is mounted upon the slide bar 73 over the enlarged orifices 102 and 102′, being attached thereto by bolts 104 which extend through slotted orifices 105 in the plate 103. A spring member 106 is connected with a projecting end of the plate 103 to resiliently hold it in a centered position upon the slide bar 73 and supplementary orifices 107 are centered through this plate over the orifices 102 and 102′ which are of only slightly greater diameter than the shafts 32 and 33. It follows that these orifices 107 may be offset whenever the lever 31 is shifted until the shafts 32 and 33 are released from their depressed position, and then move under the shoulder at the reduced diameter sections 88 to lock the shafts in an extended position.

The speed change pushbutton 34 extends through the panel, case top and flanges of the channel 70 to a switch 108 for conventional operation which need not be described herein.

The mechanisms hereinabove described permit a recording and playback operation with the tape moving in one direction only, from reel 23*a* to reel 23 as indicated by the arrow B. However, it is to be understood that other arrangements of elements are possible which are within the scope of the invention which would permit operation of the tape in both directions of movement. It is to be further noted that alternatives and equivalents of constructions are possible, such, for instance, as the constructions shown in Figs. 8 and 10.

Figure 8:
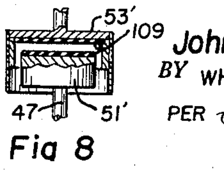
Figure 8 is a view similar to Fig. 6 but on a somewhat reduced scale, showing an alternate construction of the elements therein illustrated.

Figure 8 shows an alternate magnetic clutch construction wherein the rotor 51' and the hub 53' have frictionally contactable inner surfaces, as 109 whereby when one of the rotors is fully inserted within the armature, the frictional engagement produces a positive contact for a direct drive.

Figure 10:
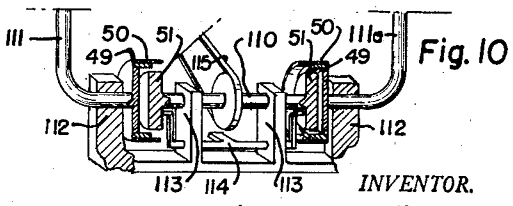
Figure 10 is a diagrammatic view similar to Fig. 9 but showing an alternate arrangement of the driving elements therein.

Figure 10 shows an alternative arrangement of driving means wherein the rotors 51 are mounted upon a common shaft 110 which is horizontally disposed across the unit with the armatures 50 mounted in common axial alignment therewith upon flexible shafts 111 and 111*a* which replace the drive shafts 24 and 24*a*. The shafts 111 and 111*a* are carried by suitable bearing members 112 and turn upwardly through the top of the case 20 for connection to the reels 23 and 23*a*. The shaft 110 is slidably mounted in bearing members 113 to permit lateral alternative shifting of the rotors 51 into and out of their respective armatures 50. This shifting is accomplished by an extended finger 114 which may be formed as a yoke to bear against the end of each rotor 51 and it is directly connected to the shifting bar 66 in any conventional manner.

Figures 18, 19, 20:
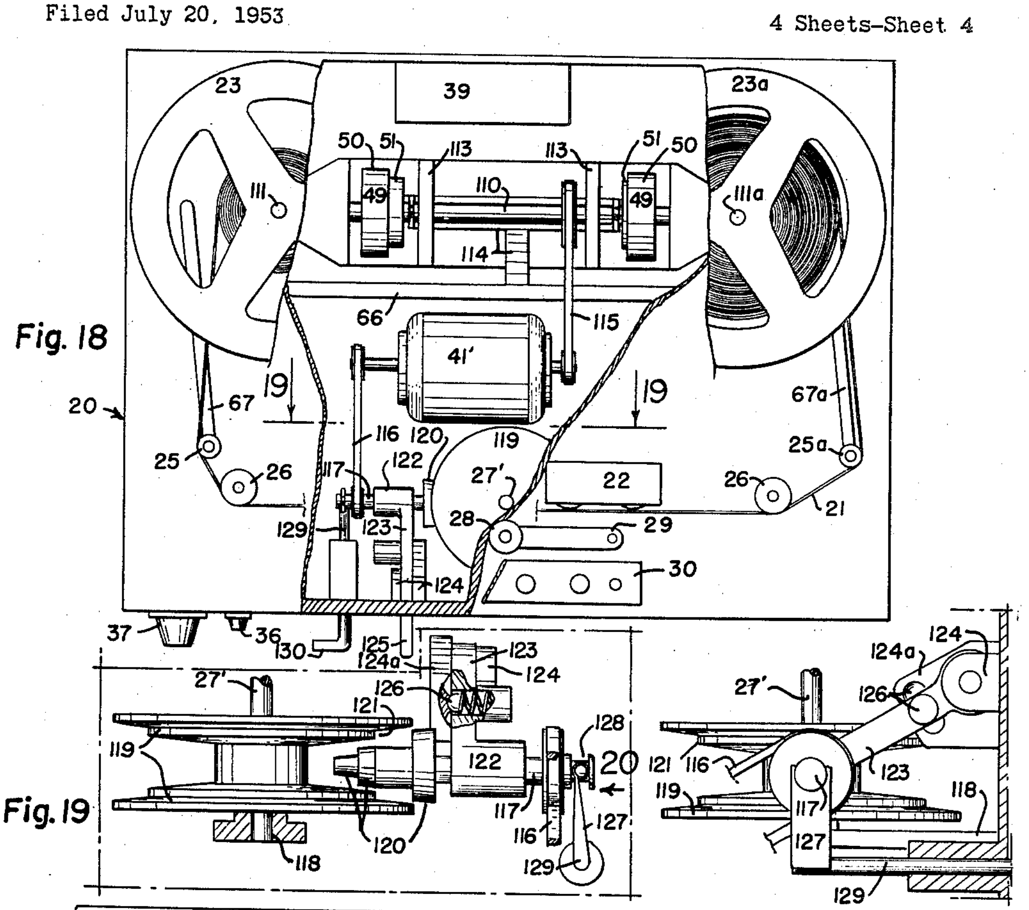
Figure 18 is a plan view similar to Fig. 1, but with portions of the panel cover removed to show parts otherwise hidden from view and depicts an alternate arrangement of driving and controlling elements including those illustrated at Fig. 10 to permit the apparatus to be operated at selected, variable speeds and in either direction.
Figure 19 is a fragmentary sectional detail as viewed from the indicated line 19—19 at Fig. 18 but on an enlarged scale.
Figure 20 is a fragmentary detail as viewed from the indicated arrow 20 at Fig. 19.

Fig. 18 shows such an arrangement in the case 20 with the shaft 110 connected to a motor 41' by a pulley-belt arrangement 115 attached to an extended end of the shaft of motor 41' and with the finger 114 attached to the shifting bar 66. In this arrangement the motor 41' has its drive shaft horizontally disposed in spaced parallellism with the shaft 110 and the opposite end of the drive shaft has a pulley-belt connection 116 which is connected to a horizontally disposed, parallel drive shaft 117 adapted to operate a modified form of the capstan 27'.

In this construction shown at Figs. 18, 19 and 20 the capstan 27' comprises a vertical shaft mounted upon a bearing 118 and includes a pair of opposing disc-type drive plates 119 spaced respectively above and below the shaft 117 with the end of the shaft 117 extended between the discs. A set of drive wheels 120 is mounted upon the end of this shaft 117 and a wheel is adapted to drive the capstan in either direction by selective contact with the disc plates 119. Three drive wheels are illustrated in the showing and are of various diameters while the face of the disc plates 119 is stepped as at 121 in such a manner that longitudinal shifting of the shaft 117 will permit contact of a selected drive wheel with the face of the disc 119 to provide selected speed of the wheel.

The shaft 117 is slidably and rotatably mounted in a bearing 122 which is swingably carried upon an arm 123 attached to the wall of the case as in lugs 124 and 124*a* in alignment with the pulley belt drive 116 to permit the wheels 120 to be swung against either disc plate 119 without changing the tension of the belt arrangement 116. To permit such shifting the arm 123 may be extended through the wall of the case to a manually operated lever 125. A ball-pocket lock arrangement as indicated at 126 may be formed upon the arm 123 and in an extension of lug 124*a* to hold the wheel 120 in position against a disc 119 once it is shifted thereto.

Longitudinal shiftable movement of the shaft 117, to contact any selected wheel 120 against the face of a disc, may be effected by movement of an arm 127 which terminates as a yoke carried in a groove 128 at one end of the shaft 117. This arm 127 extends downwardly below the shaft 117 and it is pivotally carried by a transverse rod 129 which extends through the case 20 to a lever 130 outside of the case to provide said selective shifting. In the showing the shaft 117 may be shifted to any one of three selected positions and these positions may be fixed by any conventional stops on the shaft 129 which holds it at any selected position. As a further refinement, the stops may be individually adjustable to permit precise speed adjustment of the capstan and adjustments from time to time which may be necessitated by the wear of the wheels.

Figure 21:
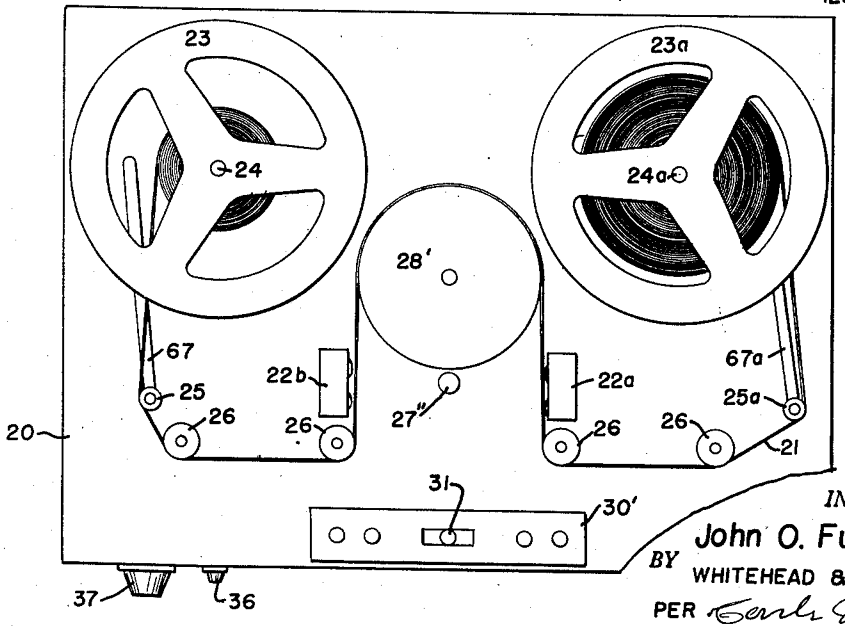
Figure 21 is similar to Fig. 1 showing an alternate arrangement of driving means especially adapted for operation of the recording apparatus in both directions and particularly adapted to provide means for suddenly changing the direction of tape movement without requiring the apparatus to come to a complete stop.

The arrangement shown in Fig. 21 provides a modified form of the pressure roller 28' which moves the tape against the capstan. This pressure roller 28' in the Fig. 21 construction is formed as a large wheel around which the tape extends and the capstan 27'' is mounted to bear directly against roller 28' instead of bearing against the tape. This roller 28' is adapted to be moved away from the capstan 27'' to stop the unit or to provide fast rewind operations and the operative means in the control panel 30' is adapted to provide such movement whenever the unit is stopped and is further adapted to provide a resilient force which pulls the roller 28' away from the capstan, whenever there is no tension upon the tape, but to permit normal tape tension to pull the roller 28' against the capstan for driving the unit. The means for providing such movement and such resilient pressure on the roller 28' is not shown, being formed in any suitable manner as by a resiliently operated lever arm arrangement under the panel. This unit is especially adapted for forward and reverse playback and there may be provided a pair of recording, playback and erasing heads 22*a* and 22*b* on each side of the unit. In operation, any instant the tape becomes slacked, the roller 28' goes away from the capstan 27 to prevent an unbalanced force on the tape. In operation the tape is either stopped or operated as a quick wind or rewind movement with the roller moved away from the capstan 27'. Whenever a playback or record operation commences, the roller 28' is moved against the capstan 27' and this may be done without requiring that the reels come to a full stop as during a rewinding operation, for the unbalanced tension of the tape will cause the roller 28' to move away and slippage to occur between the capstan and the roller until the pressures are balanced.

While I have illustrated and described many details of construction, alternatives and equivalents will occur to those skilled in the art which are within the scope and spirit of my invention; hence it is my desire that my protection be not limited to the details herein illustrated and described, but only by the proper scope of the appended claims.

I claim:

1. The combination with a tape recording machine having a pair of reels carried upon spaced shafts, a length of tape connecting the reels and shiftable from one reel to the other by rotation of the reels, a constantly rotating drive and a pair of variable-torque-imposing shiftable slip clutches interconnecting each reel shaft with the drive, of shifting means interconnecting said clutches in inverse relation whereby shift movement of the means in one direction effects an increase of torque upon one reel shaft and a decrease of torque upon the other reel shaft and movement of the means in the opposite direction effects opposite increase and decrease of torque, said shifting means including a guide pin adjacent to a reel adapted to contact, bear against and deflect the reach of tape extending from the reel and thereby be shifted responsive to the variation of the amount of tape on the reel and tension of the tape extending from the reel.

2. The combination with a tape recording machine having a pair of reels carried upon spaced shafts, a length of tape connecting the reels and shiftable from one reel to the other by rotation of the reels, a constantly rotating drive and a pair of variable-torque-imposing shiftable slip clutches interconnecting each reel shaft with the drive, of shifting means interconnecting said clutches in inverse relation whereby shift movement of the means in one direction effects an increase of torque upon one reel shaft and a decrease of torque upon the other reel shaft and movement of the means in the opposite direction effects opposite increase and decrease of torque, said shifting means including a pair of spaced guide pins with one guide pin being adjacent to each reel adapted to contact, bear against and deflect the reach of tape extending from the reel in opposition to the other guide pin whereby both guide pins are shifted responsive to the variation of the amount of tape on the reels and tension of the tape extending from the reels.

3. The combination defined in claim 2 wherein said pair of interconnected spaced guide pins are interlocked to operate in unison.

4. The combination with a tape recording machine or the like having a pair of reels carried upon spaced shafts, a length of tape connecting the reels and shiftable from and onto each reel responsive to reel rotation and tape shifting means at the tape reach between the reels adapted to start, stop and to shift the tape from one reel to the other, of torque-regulating means adapted to rotate each shaft and reel thereon to take up and pay out tape responsive to the action of said tape shifting means, to hold the tape reach between the reels at a substantially balanced selected tension and to accelerate the reel rotation in the direction of and responsive to the action of said tape shifting means, said means including a constantly rotating drive and a pair of variable-torque-imposing shiftable slip clutches interconnecting each reel shaft with a drive, clutch-shifting means including a pair of shiftable interconnected spaced guide pins with a guide pin being adjacent to each reel and being adapted to contact, bear against and deflect the reach of the tape extending from that reel in opposition to the flexure of the tape by the pin against the tape at the other reel whereby both guide pins are shifted responsive to the variation of the amount of tape on the reels and the tension of the tape extending from the reels.

5. In the organization defined in claim 4, a fixed roller near each reel about which the tape extends with said guide pins being between the reels and the rollers.

6. The combination with a tape recording machine having a pair of reels carried upon spaced shafts, a length of tape connecting the reels and shiftable from one reel to the other by rotation of the reels, a constantly rotating drive and a pair of variable-torque-imposing shiftable slip clutches interconnecting each reel shaft with the drive of, shifting means interconnecting said clutches in inverse functional relation whereby movement of the means in one direction effects an increase of torque upon one reel shaft and a decrease of torque upon the other reel shaft and movement of the means in the opposite direction effects opposite increase and decrease of torque, said shifting means including an arm adjacent to a reel and carrying a guide pin adapted to contact, bear against and deflect the reach of tape between the reels at a point near a reel and be shifted by variation of the amount of the tape on the reel as it is wound onto and off from the reel, and the tension of the tape extending from the reel, said shifting means being thereby moved responsive to the variation of the amount of tape on the reel and by tape tension, the respective length of said arm being proportioned to produce differential torques on the reel shafts proportional to the differential reeled diameters of the tape wound upon the reels.

7. The combination with a tape recording machine having a pair of reels carried upon spaced shafts, a length of tape connecting the reels and shiftable from one reel to another reel by rotation of the reels, a constantly rotating drive and a pair of variable-torque-imposing shiftable slip clutches interconnecting each reel shaft with the drive, clutch control means adapted to hold the reach of tape between the reels under a substantially constant tension and balance the rotating torques of the reels and including a shifting means interconnecting said clutches in inverse functional relation whereby movement of the means in one direction effects an increase of torque on one reel shaft and a decrease of torque on the other shaft and movement of the means in the opposite direction effects opposite increase and decrease of torque, a pair of spaced levers with each including an arm adjacent to a reel carrying a guide pin adapted to contact, bear against and deflect the reach of tape between the reels at a point adjacent to a reel whereby pressure is brought to bear against the arm by the tape for shifting the arm responsive to the variation of amount of tape on the reel and the tension of the tape extending from the reel, and an extension arm on each lever attached to the shifting bar whereby said levers are adapted to shift in unison, the respective lengths of the said lever arms and of said extension arms being proportioned to produce differential torques on the reel shafts proportional to the differential diameters of the tape wound upon the reels.

8. In a tape recording machine of the type having a pair of reels carried upon spaced shafts, a length of tape connecting the reels and shiftable from one reel to the other by rotation of the reels and a driving capstan contacting the reach of tape between the reels; reel rotating means for winding and unwinding tape from the reels to hold the reach of tape between reels under a substantially constant tension and accelerate the reel rotation as the capstan engages the tape for movement, said means including a constantly rotating drive, a pair of variable-torque-imposing, shiftable clutches interconnecting each reel with the drive, a shifting means interconnecting said clutches in inverse functional relation whereby movement of the means in one direction effects an increase of torque on one reel shaft and a decrease of torque on the other reel shaft and movement of the means in the opposite direction effects an opposite increase and decrease of torque, a lever including a guide pin adjacent to each reel adapted to contact, bear against and deflect the reach of tape between said reel and the capstan, an extension arm interlocking said levers and being attached to the shifting means whereby said levers operate in unison, said guide pins being aligned to and against the tape to form opposed offsets in the paths of tape from the reels to the capstan, whereby with the reaches of tape under equal tension the offsets of deflected tape are balanced but when under differential tension, as when the capstan commences to move the tape, the offsets of deflected tape are unbalanced and thereby effect a shift of the levers and shift means and thereby change the torques on the reel shafts, the respective lengths of the lever arms being proportioned to produce differential torques on the reel shafts proportional to the differential diameters of tape wound upon the reels when the system is at rest or the reels are rotating at a uniform rate.

9. In the apparatus defined in claim 8 wherein said clutches are formed as an armature having a tubular body of non-magnetic material encased within a tubular sheath of magnetic metallic material which extends beyond the end of the body to form an overhang and a magnetic rotor to shiftably move into and out of said body.

10. In the apparatus defined in claim 8 said clutches including an armature having a tubular body of non-magnetic material encased within a tubular sheath of magnetic metallic material and a magnetic rotor adapted to move into and out of said body with corresponding elements of each clutch being affixed to the drive shaft in common axial alignment and the reel shafts including flexible shaft portions being turned from said common axial alignment at the clutches to an axial alignment spaced parallelism at the reels at said flexible shaft portions.

References Cited in the file of this patent

UNITED STATES PATENTS

| | | |
|---|---|---|
| 1,862,267 | Honig | June 7, 1932 |
| 1,992,706 | Lira | Feb. 26, 1935 |
| 2,215,468 | Herzig | Sept. 24, 1940 |
| 2,365,691 | Fodor | Dec. 26, 1944 |
| 2,447,130 | Matulaitis et al. | Aug. 17, 1948 |
| 2,500,903 | Neff | Mar. 14, 1950 |
| 2,539,858 | Offcutt | Jan. 30, 1951 |
| 2,609,998 | Sear | Sept. 9, 1952 |
| 2,610,808 | Davis | Sept. 16, 1952 |
| 2,625,337 | Williams | Jan. 13, 1953 |
| 2,660,380 | Blackman et al. | Nov. 24, 1953 |